United States Patent
Mori

(10) Patent No.: US 9,946,925 B2
(45) Date of Patent: Apr. 17, 2018

(54) TERMINAL DEVICE, OUTPUT SYSTEM AND OUTPUT METHOD

(71) Applicant: Shinya Mori, Tokyo (JP)

(72) Inventor: Shinya Mori, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 4 days.

(21) Appl. No.: 15/017,738

(22) Filed: Feb. 8, 2016

(65) Prior Publication Data
US 2016/0274833 A1 Sep. 22, 2016

(30) Foreign Application Priority Data

Mar. 16, 2015 (JP) .................................. 2015-051675

(51) Int. Cl.
*G06F 3/12* (2006.01)
*G06K 9/00* (2006.01)
*H04N 1/00* (2006.01)

(52) U.S. Cl.
CPC ....... *G06K 9/00469* (2013.01); *G06F 3/1204* (2013.01); *G06F 3/1261* (2013.01); *G06F 3/1285* (2013.01); *H04N 1/00411* (2013.01); *H04N 2201/0094* (2013.01)

(58) Field of Classification Search
None
See application file for complete search history.

(56) References Cited

U.S. PATENT DOCUMENTS

| | | | |
|---|---|---|---|
| 2002/0097431 A1* | 7/2002 | Ikegami | G06F 21/608 358/1.15 |
| 2007/0097423 A1* | 5/2007 | Kawano | G06F 3/1285 358/1.15 |
| 2007/0273923 A1* | 11/2007 | Kimura | G06F 3/122 358/1.15 |
| 2013/0250356 A1* | 9/2013 | Sasakura | G06F 3/1222 358/1.15 |

FOREIGN PATENT DOCUMENTS

| | | | |
|---|---|---|---|
| JP | 2009151618 A | * | 7/2009 |
| JP | 2013-008353 | | 1/2013 |
| JP | 2015-215825 | | 12/2015 |
| WO | 2015/174309 | | 11/2015 |

\* cited by examiner

*Primary Examiner* — Huo Long Chen
(74) *Attorney, Agent, or Firm* — IPUSA, PLLC

(57) ABSTRACT

A terminal device connected to one or more output devices via a network, includes an output destination distribution control unit that reads out an output destination of output data for which outputting is requested by a user from first information in which a condition for output data and an output destination are in correspondence with each other; and a confirmation screen display determining unit that refers to second information in which a user and an output destination that is previously selected by the user to distribute output data are in correspondence with each other, and causes, when the output destination read out from the first information is not in correspondence with the user in the second information, to display a confirmation screen of the output destination.

14 Claims, 10 Drawing Sheets

| RULE ID | RULE | CONDITION | ACTION |
|---|---|---|---|
| 1 | WHEN "MEDICINE" IS DETECTED, OUTPUT TO "PRINTER A" | KEYWORD<br><br>KEYWORD: "MEDICINE" | DETERMINE OUTPUT DESTINATION<br><br>OUTPUT DESTINATION: "PRINTER A" |
| 2 | WHEN "SURGERY" IS DETECTED, OUTPUT TO "PRINTER B" | KEYWORD<br><br>KEYWORD: "SURGERY" | DETERMINE OUTPUT DESTINATION<br><br>OUTPUT DESTINATION: "PRINTER B" |
| ... | ... | ... | ... |

FIG.10

| HISTORY ID | USER NAME | OUTPUT DESTINATION |
|---|---|---|
| 1 | User1 | Printer1 |
| 2 | User1 | Printer2 |
| 3 | User2 | Printer1 |
| ... | ... | ... |

FIG.11

CONFIRMATION OF OUTPUT DESTINATION ×

MATCHED CONDITION:
 KEYWORD "MEDICINE"

THE DATA WILL BE OUTPUT FROM "PRINTER A".
DO YOU WANT TO CONTINUE PRINTING?

YES  NO  ⟋1000
1001  1002

| ID | USER | DOUBLE CHECKING USER |
|---|---|---|
| 1 | User1 | User2 |
| 2 | User2 | User1 |
| 3 | User3 | – |
| ... | ... | ... |

TERMINAL DEVICE, OUTPUT SYSTEM AND OUTPUT METHOD

BACKGROUND OF THE INVENTION

1. Field of the Invention

The present invention relates to a terminal device, an output system and an output method.

2. Description of the Related Art

Conventionally, an output destination distribution system is already known in which an output destination is determined in accordance with information or the like extracted from print data, and printing is performed by an image forming apparatus of the determined output destination.

For example, an output destination distribution system is known in which an output destination is determined in accordance with information or the like specific to a computer from which a printing instruction is performed, and printing is performed by an image forming apparatus of the determined output destination (see Patent Document 1, for example).

However, for example, by the output destination distribution system in which a keyword is extracted from print data, and an output destination is determined in accordance with the keyword, there is a possibility that the print data is wrongly distributed to an unintended output destination. As such, according to the conventional output destination distribution system, there is a case that the print data is wrongly distributed to the unintended output destination.

Here, such a problem is not limited to an output destination distribution system in which print data is distributed, but exists for an output destination distribution system in which output data such as image data or the like is distributed to an output device such as a projector, a monitor or the like.

PATENT DOCUMENT

[Patent Document 1] Japanese Laid-open Patent Publication No. 2013-8353

SUMMARY OF THE INVENTION

The present invention is made in light of the above problems, and provides a terminal device capable of preventing a situation in which output data is distributed to a wrong output destination.

According to an embodiment, there is provided a terminal device connected to one or more output devices via a network, including an output destination distribution control unit that reads out an output destination of output data for which outputting is requested by a user from first information in which a condition for output data and an output destination are in correspondence with each other; and a confirmation screen display determining unit that refers to second information in which a user and an output destination that is previously selected by the user to distribute output data are in correspondence with each other, and causes, when the output destination read out from the first information is not in correspondence with the user in the second information, to display a confirmation screen of the output destination.

BRIEF DESCRIPTION OF THE DRAWINGS

Other objects, features and advantages of the present invention will become more apparent from the following detailed description when read in conjunction with the accompanying drawings.

FIG. 4 is a process block diagram illustrating an example of an output destination distribution plug-in;

FIG. 5 is a process block diagram illustrating an example of a condition plug-in;

FIG. 6 is a process block diagram illustrating an example of a print flow plug-in;

FIG. 7 is a view illustrating an example of a structure of a defined rule;

FIG. 10 is a view illustrating an example of a structure of a history table;

FIG. 11 is an image view illustrating an example of a confirmation screen;

DETAILED DESCRIPTION OF THE PREFERRED EMBODIMENTS

Figure 1:
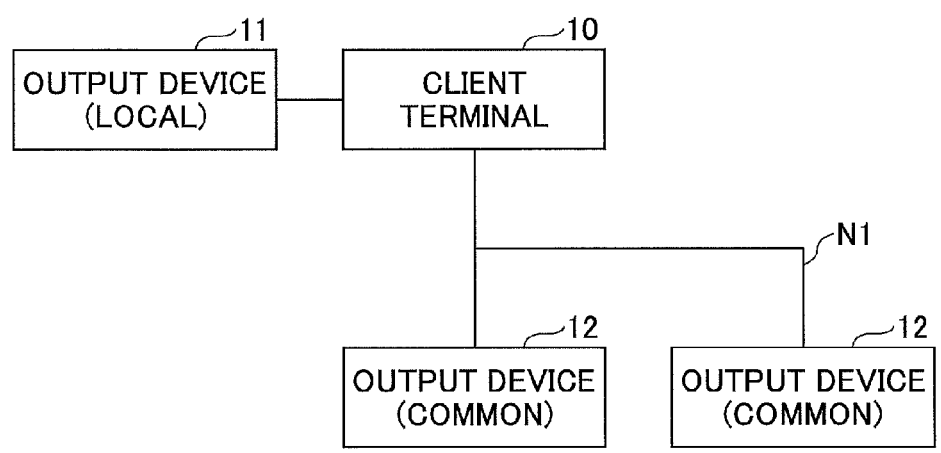
FIG. 1 is a view illustrating an example of a structure of a print system of an embodiment.

The invention will be described herein with reference to illustrative embodiments. Those skilled in the art will recognize that many alternative embodiments can be accomplished using the teachings of the present invention and that the invention is not limited to the embodiments illustrated for explanatory purposes.

It is to be noted that, in the explanation of the drawings, the same components are given the same reference numerals, and explanations are not repeated.

Although a print system is described as an example of an output system in this embodiment, the present invention is not limited to a print system. For example, the output system may be a system that performs outputting of output data such as printing, projecting, displaying, transferring or the like.

First Embodiment (System structure)

FIG. 1 is a view illustrating an example of a structure of a print system 1. The print system 1 of FIG. 1 includes a client terminal 10 and common output devices 12 connected with each other via a network N1 such as LAN or the like. The print system 1 further includes a local output device 11 connected to the client terminal 10. Each of the client terminal 10, the local output device 11 and the common output devices 12 has a wired or wireless communication means.

Although an example is described in FIG. 1 in which the print system 1 includes one client terminal 10 and one local output device 11, the print system 1 may include a plurality of client terminals 10 and/or a plurality of local output devices 11. Further, although an example is described in FIG. 1 in which the print system 1 includes two common output devices 12, the print system 1 may include one common output device 12 or three or more common output devices 12.

The client terminal 10 is a data processing apparatus such as a PC or the like used by a user. The client terminal 10 is a terminal device such as a smartphone, a mobile phone, a PC or the like. The output device 11 is an image forming apparatus such as a printer or the like, for example, that is directly connected to the client terminal 10 by a wired or wireless communication. The output device 12 is an image forming apparatus such as a printer or the like that is connected to the network N1 by a wired or wireless communication.

Each of the output devices 11 and 12 may be a projection device or a display device that outputs a display such as a projector, a monitor or the like, a voice output device that outputs voice data such as an audio, or the like, in addition to an image forming apparatus such as a printer, a copying machine, a multifunction peripheral, a laser printer or the like. The print system 1 of FIG. 1 is just an example.

(Hardware Structure)

Figure 2:
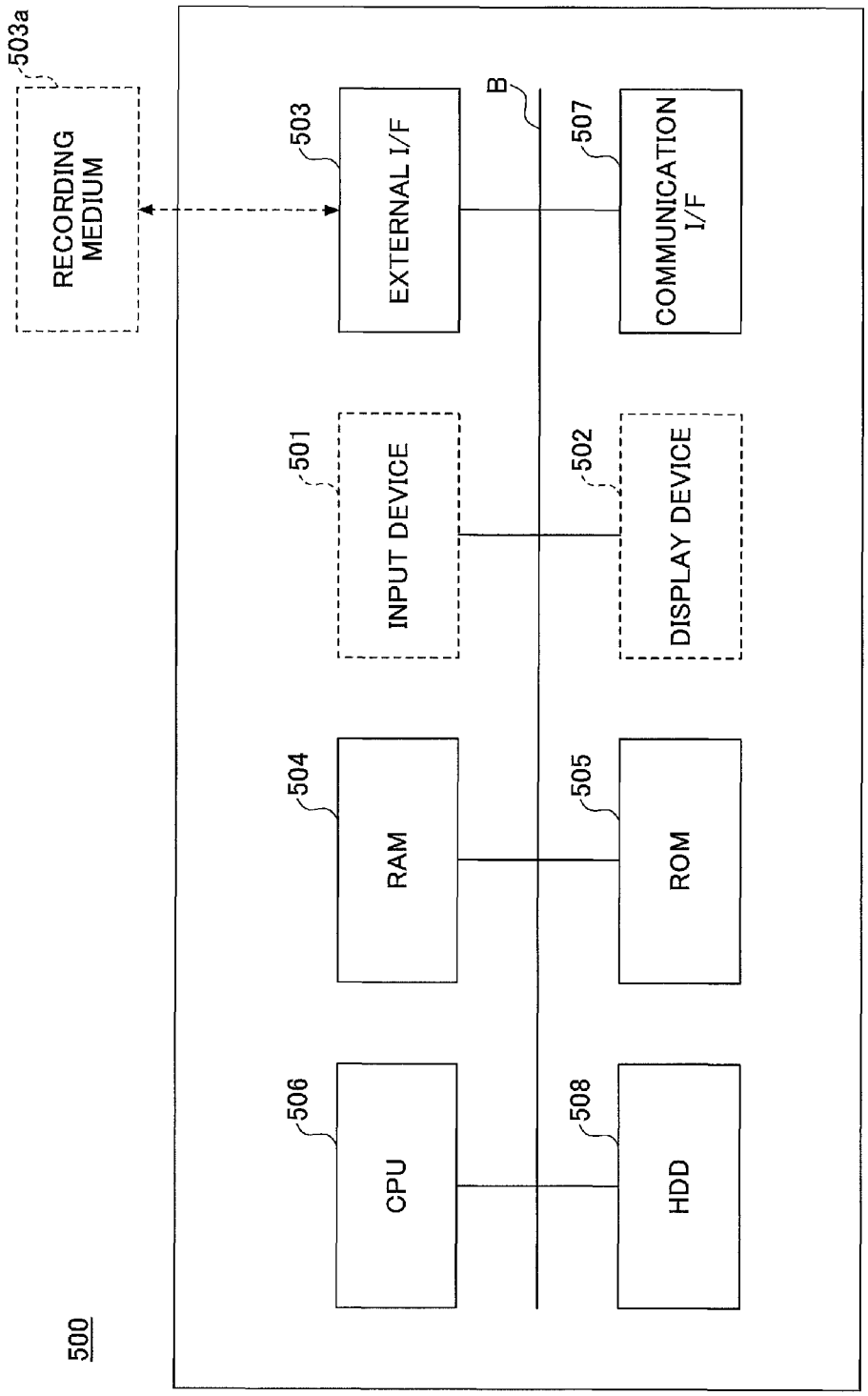
FIG. 2 is a view illustrating an example of a hardware structure of a computer of the embodiment.

The client terminal 10 illustrated in FIG. 1 is actualized by a computer having a hardware structure illustrated in FIG. 2. FIG. 2 is a view illustrating an example of a hardware structure of a computer of the embodiment.

A computer 500 illustrated in FIG. 2 includes an input device 501, a display device 502, an external I/F 503, a RAM 504, a ROM 505, a CPU 506, a communication I/F 507, a HDD 508 and the like which are connected with each other by a bus B. The input device 501 and the display device 502 may be connected only when it is necessary.

The input device 501 includes a keyboard, a mouse, a touch panel or the like, and is used by a user to input various operation signals. The display device 502 includes a display or the like and displays a processed result by the computer 500.

The communication I/F 507 is an interface that connects the computer 500 to the network N1. With this configuration, the computer 500 can perform data communication via the communication I/F 507.

The HDD 508 is an example of a non-volatile storage device that stores programs or data. The programs or data stored in the HDD 508 include an OS that is basic software for controlling the entirety of the computer 500, application software (hereinafter, simply referred to as "application" as well) that provides various functions on the OS or the like, for example. The computer 500 may include a drive device that uses a flash memory as a recording medium (a Solid State Drive (SSD), for example) instead of the HDD 508.

The external I/F 503 is an interface for an external device. As the external device, a recording medium 503a or the like may be used. With this configuration, the computer 500 can read and/or write data from and on the recording medium 503a via the external I/F 503. As the recording medium 503a, a flexible disk, a Compact Disk (CD), a Digital Versatile Disk (DVD), an SD Memory card, a Universal Serial Bus memory (USB memory) or the like may be used.

The ROM 505 is an example of a non-volatile semiconductor memory (storage device) that can store programs and data even when the power switch is turned off. The ROM 505 stores programs and data such as a Basic Input/Output System (BIOS) that is executed when activating the computer 500, an OS setting, a network setting or the like. The RAM 504 is an example of a volatile semiconductor memory (storage device) that temporarily stores programs and data.

The CPU 506 is an arithmetic unit that actualizes control and functions of the entirety of the computer 500 by reading out programs or data from the storage device such as the ROM 505, the HDD 508 or the like on the RAM 504 and executing the processes. The client terminal 10 of the embodiment is capable of actualizing various processes, which will be explained later, by the above described hardware structure of the computer 500.

(Software Structure)
(Client Terminal)

Figure 3:
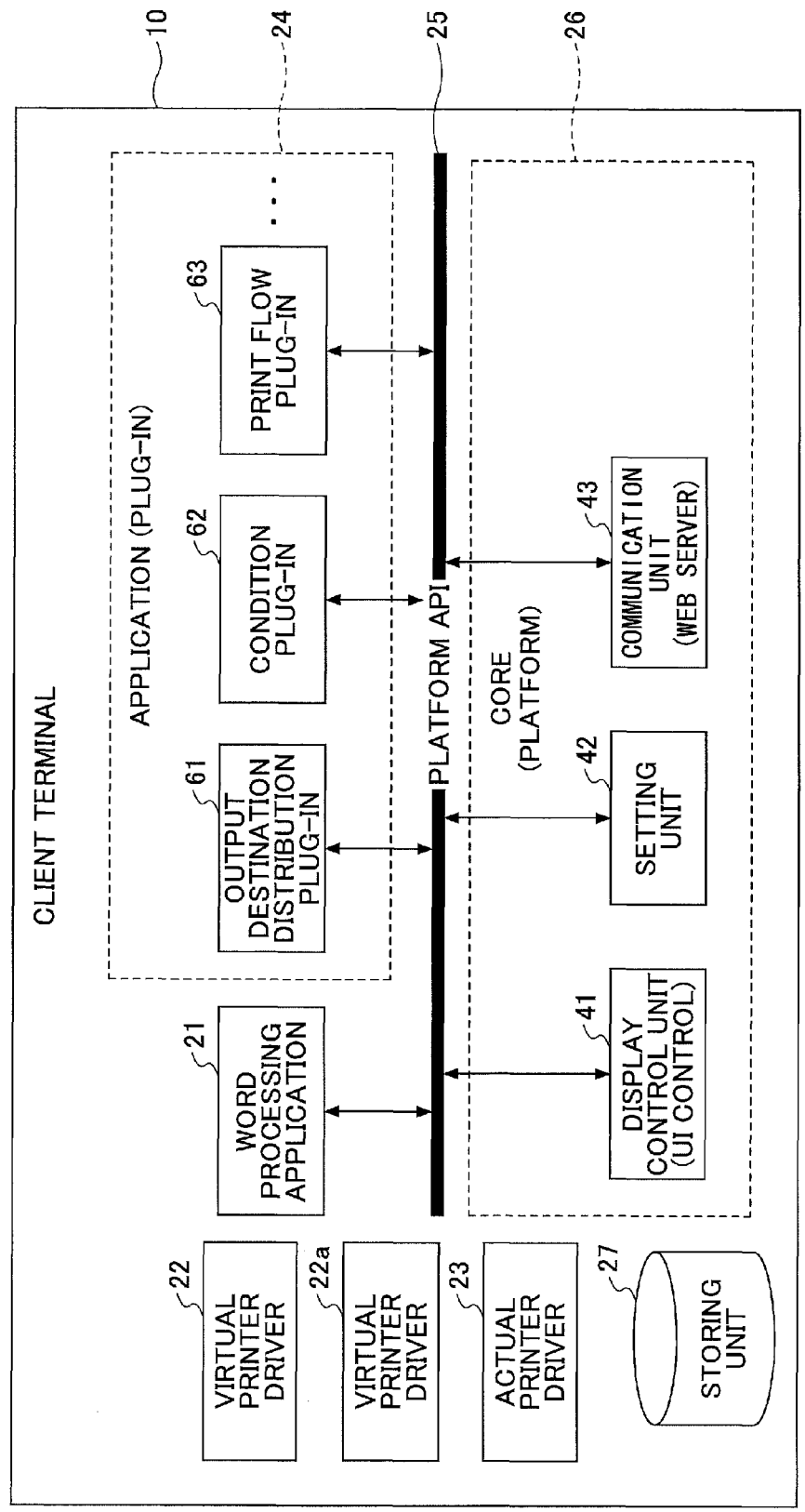
FIG. 3 is a process block diagram illustrating an example of a client terminal of the embodiment.

The client terminal 10 of the embodiment is actualized by a process block illustrated in FIG. 3, for example. FIG. 3 is a process block diagram illustrating an example of a client terminal of the embodiment.

The client terminal 10 illustrated in FIG. 3 actualizes a word processing application 21, a virtual printer driver 22, a virtual printer driver 22a, an actual printer driver 23, a plug-in 24, a platform API 25, a platform 26 and a storing unit 27 by executing a program.

The plug-in 24 includes an output destination distribution plug-in 61, a condition plug-in 62 and a print flow plug-in 63. The platform 26 includes a display control (UI control) unit 41, a setting unit 42 and a communication unit 43.

The word processing application 21 is an example of an application that accepts a request of printing from a user. The word processing application 21 is just an example, and alternatively, an application that accepts a request of outputting such as printing or the like from a user may be used.

The virtual printer driver 22 is a printer driver that converts application data to platform-independent intermediate print data and outputs it. The intermediate print data is print data that does not depend on the kinds of the output device 11 or the output device 12.

Data of an XPS (XML Paper Specification) format is an example of the intermediate print data. The application data is an example of data to output. The virtual printer driver 22a is an example of a virtual printer driver for using the output destination distribution plug-in 61, the condition plug-in 62 and the print flow plug-in 63. The virtual printer driver 22a converts application data to platform-independent intermediate print data and outputs it.

The actual printer driver 23 converts the intermediate print data to actual print data that is in a format capable being printed by the output device 11 or the output device 12 and outputs it. Data in a RAW format is an example of the actual print data.

The plug-in 24 is software that is operated on the platform 26. The plug-in 24 can use functions of the platform 26 by using the platform API 25.

The platform API 25 is an interface for the plug-in 24 to use the functions of the platform 26. The platform API 25 is a previously defined interface provided for the platform 26 to receive a request from the plug-in 24, and is configured by a function, a class or the like, for example.

The display control unit 41 of the platform 26 controls display by the display device 502 based on a request from the word processing application 21, the plug-in 24 or the like, for example. The setting unit 42 performs setting of the plug-in 24. The communication unit 43 performs communication with external devices. The storing unit 27 stores settings or the like.

The client terminal 10 aggregates processes by aggregating functions that are commonly used by the plug-in 24 to the platform 26. Here, the classification of the process block diagram of FIG. 3 is just an example and it is not essential to classify the components into levels illustrated in FIG. 3.

The output destination distribution plug-in 61 distributes the intermediate print data generated by the virtual printer driver 22a to an output destination among the output devices 11 and 12 based on a rule (condition and action). The condition plug-in 62 determines matching of a condition for determining the output destination. The condition for determining the output destination includes time, the number of printing, a keyword or the like.

The print flow plug-in 63 controls print flow. For example, the print flow plug-in 63 controls to output the actual print data from the output devices 11 and 12 by using the actual printer driver 23.

Here, for the plug-in 24, an administrator or a user can install any desired plug-in. Thus, the plug-in 24 is not limited to the structure as illustrated in FIG. 3.

(Output Destination Distribution Plug-in)

Figure 4:
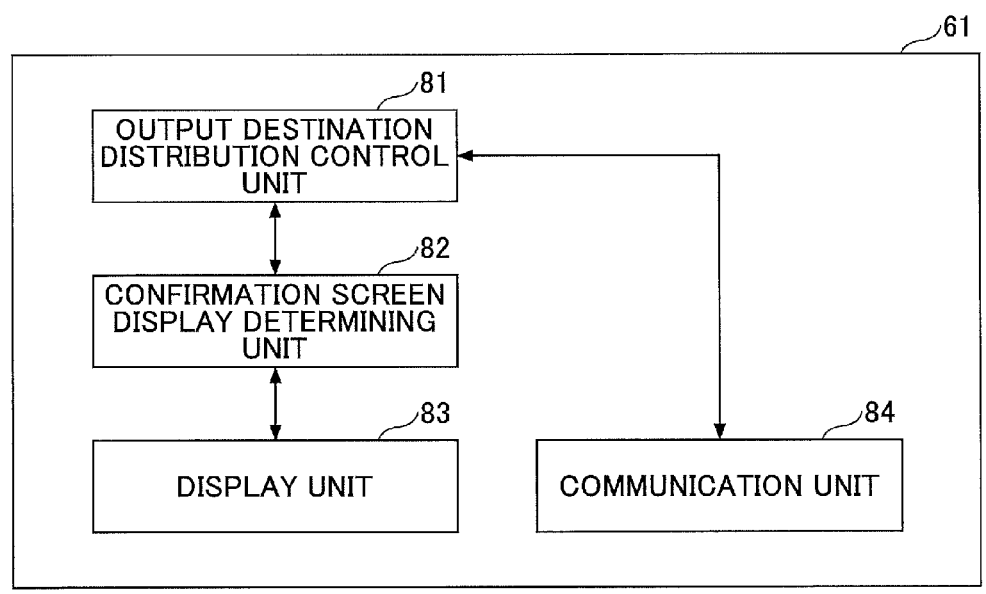

The output destination distribution plug-in 61 of the client terminal 10 is actualized by a process block as illustrated in FIG. 4, for example. FIG. 4 is a process block diagram illustrating an example of the output destination distribution plug-in 61. The output destination distribution plug-in 61 illustrated in FIG. 4 includes an output destination distribution control unit 81, a confirmation screen display determining unit 82, a display unit 83 and a communication unit 84.

The output destination distribution control unit 81 controls performance of distributing the print data to an output destination. The confirmation screen display determining unit 82 determines whether to display a confirmation screen when distributing the print data to the output destination. The display unit 83 displays the confirmation screen. The communication unit 84 communicates with the output device 11 or the output device 12.

(Condition Plug-in)

Figure 5:
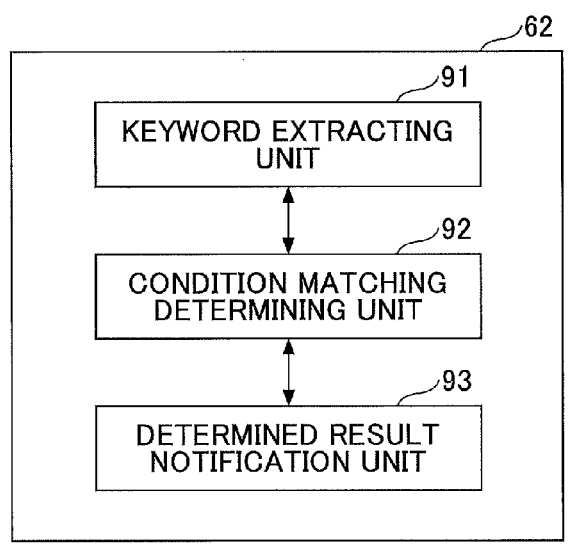

The condition plug-in 62 of the client terminal 10 is actualized by a process block illustrated in FIG. 5, for example. FIG. 5 is a process block diagram illustrating an example of the condition plug-in 62. The condition plug-in 62 of FIG. 5 includes a keyword extracting unit 91, a condition matching determining unit 92 and a determined result notification unit 93.

The keyword extracting unit 91 extracts a keyword from the print data to the output destination. The condition matching determining unit 92 determines whether the extracted keyword matches a condition of a rule that is defined as will be explained later. The determined result notification unit 93 notifies a determined result indicating whether the extracted keyword matches the condition of the rule or not to the output destination distribution plug-in 61 or the like.

(Print Flow Plug-in)

Figures 6, 7:
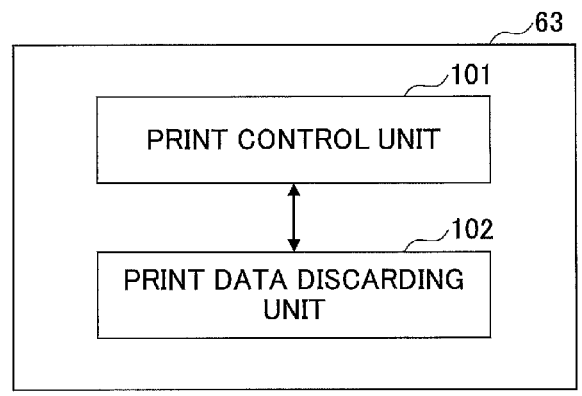

The print flow plug-in 63 of the client terminal 10 is actualized by a process block illustrated in FIG. 6, for example. FIG. 6 is a process block diagram illustrating an example of the print flow plug-in 63. The print flow plug-in 63 of FIG. 6 includes a print control unit 101 and a print data discarding unit 102. The print control unit 101 controls performance of the print flow (process flow). The print data discarding unit 102 discards print data.

(Various Settings)

The print system 1 of the embodiment accepts a definition of a rule from a setting screen.

(Rule Definition for Performing Flow)

FIG. 7 is a view illustrating an example of a structure of a defined rule. The rule is a definition of an action by a condition. The condition is a keyword, a print setting, time or the like. The action is distribution of print data to an output destination or the like. Here, the rule may be defined just by an action without a condition (unconditioned).

The client terminal 10 controls distribution of the print data to an output destination in accordance with the rules as defined in FIG. 7, for example. For example, the client terminal 10 checks the rules as defined in FIG. 7 from top in order, and performs the action that matches the respective condition.

For example, when the client terminal 10 instructs to print using the virtual printer driver 22a from the word processing application 21, the client terminal 10 controls distribution of the print data to the output destination in accordance with the rules as defined in FIG. 7.

(Detailed Process)

In the following, a process of the print system 1 of the embodiment is explained in detail.

(Distribution of Print Data to Output Destination in Accordance with Rule)

Figure 8:
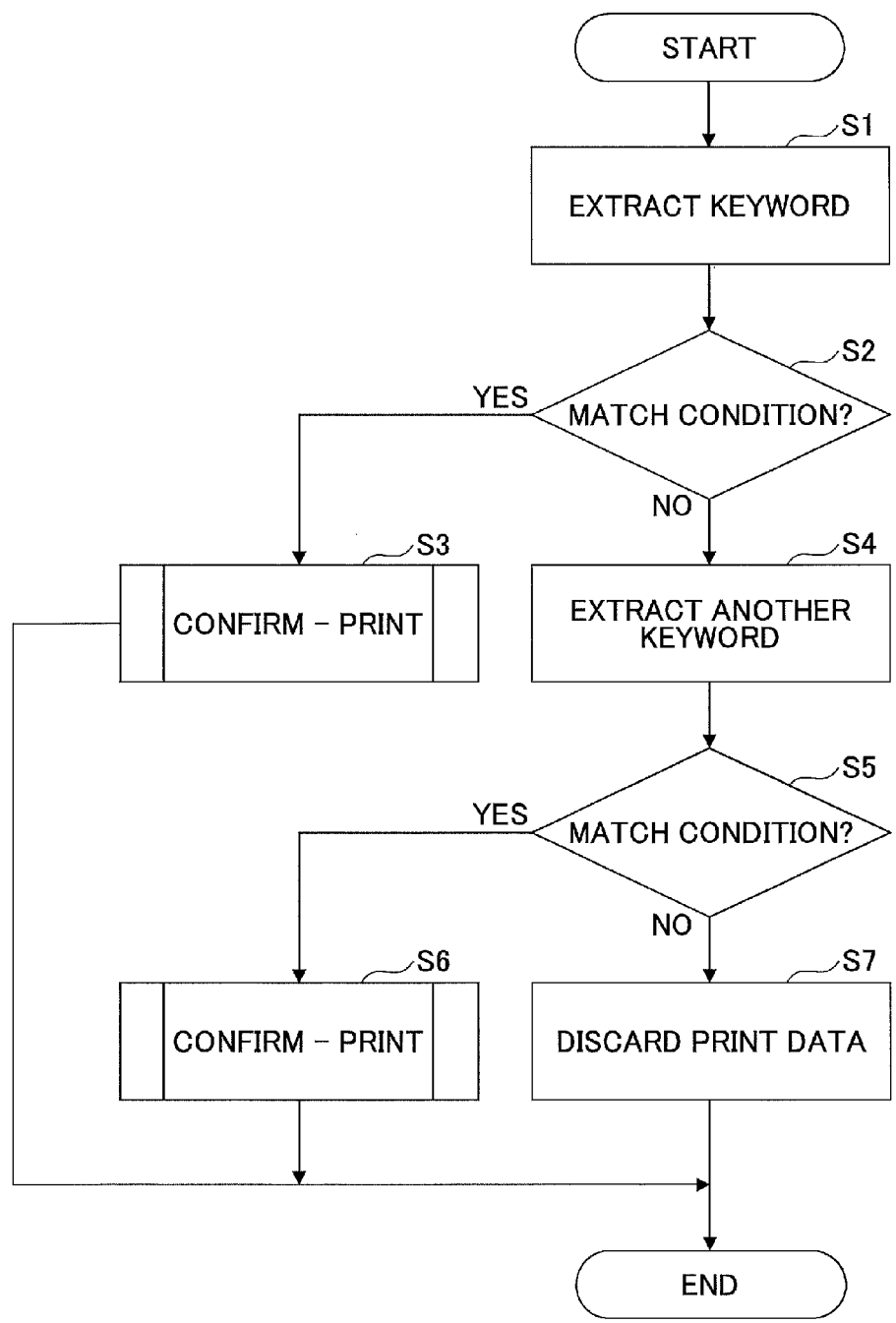
FIG. 8 is a flowchart illustrating an example of a print data distribution process to an output destination in accordance with a rule.

The client terminal 10 of the embodiment distributes print data to an output destination according to steps illustrated in FIG. 8, for example. FIG. 8 is a flowchart illustrating an example of a print data distribution process to an output destination in accordance with a rule.

For example, the word processing application 21 accepts a request of printing from the user. When a virtual printer driver other than the virtual printer driver 22a is selected, the word processing application 21 can start a print process in accordance with the printer driver such as the virtual printer driver 22 or the like selected by the user by notifying a print event to the selected printer driver.

On the other hand, when the virtual printer driver 22a is selected, the word processing application 21 sends a print event to the virtual printer driver 22a. The virtual printer driver 22a sends the print event to the condition plug-in 62.

In step S1, the keyword extracting unit 91 of the condition plug-in 62 extracts a keyword from the print data. The condition matching determining unit 92 of the condition plug-in 62 determines whether the keyword extracted in step S1 matches the condition of the rule defined as illustrated in FIG. 7, for example.

When it is determined that the keyword matches the condition of the rule, the determined result notification unit 93 of the condition plug-in 62 notifies, as a determined result, identification data (rule ID, for example) of the rule that is determined to match the condition to the output destination distribution plug-in 61. The output destination distribution plug-in 61 proceeds to step S3, and performs a "confirmation-print" process, which will be explained later.

When it is determined that the keyword does not match the condition of the rule, the keyword extracting unit 91 extracts another keyword from the print data in step S4. The condition matching determining unit 92 of the condition plug-in 62 determines whether the other keyword extracted in step S4 matches the condition of the rule defined as illustrated in FIG. 7, for example.

When it is determined that the other keyword matches the condition of the rule, the determined result notification unit 93 of the condition plug-in 62 notifies the identification data (rule ID, for example) of the rule that is determined to match the condition, to the output destination distribution plug-in 61 as the determined result. The output destination distribution plug-in 61 proceeds to step S6, and performs the "confirmation-print" process, which will be explained later.

When it is determined that the other keyword does not match the condition of the rule, the determined result notification unit 93 of the condition plug-in 62 notifies the determined result to the print flow plug-in 63. Then, the print data discarding unit 102 of the print flow plug-in 63 discards the print data for which the request of printing is accepted from the user.

In other words, when there are no keywords that match the condition of the rule among one or more keywords extractable from the print data, the determined result notification unit 93 of the condition plug-in 62 notifies the determined result to the print flow plug-in 63 to cause the print flow plug-in 63 to discard the print data.

Figure 9:
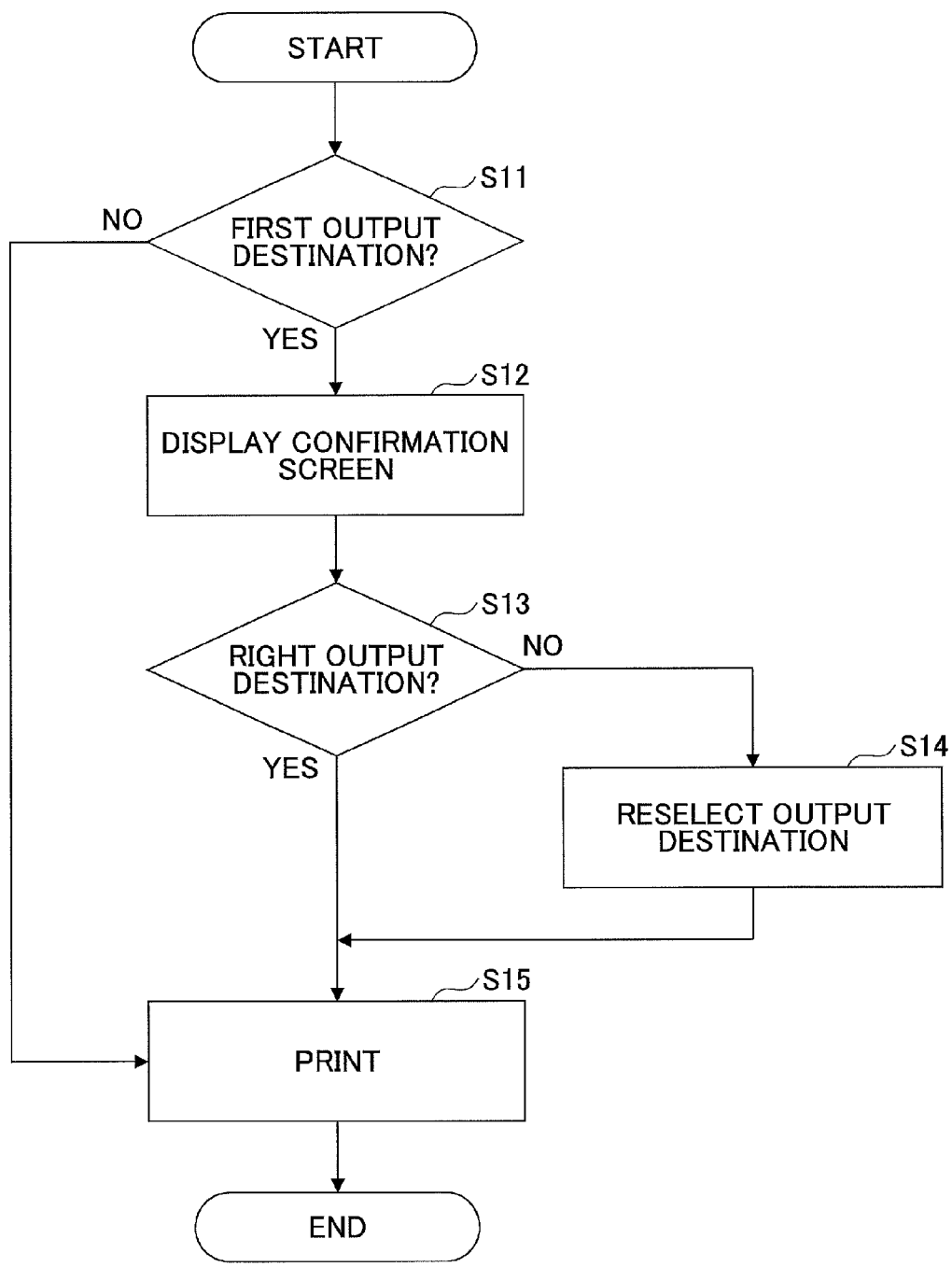
FIG. 9 is a flowchart illustrating an example of a "confirmation-print" process.

The "confirmation-print" process in step S3 and S6 is performed by steps illustrated in FIG. 9, for example. FIG. 9 is a flowchart illustrating an example of the "confirmation-print" process.

In step S11, the confirmation screen display determining unit 82 of the output destination distribution plug-in 61 reads out an output destination from the action of the rule that is determined to match the condition in step S2 or S5. Then, the confirmation screen display determining unit 82 determines whether the read out output destination is selected by the user as an output distribution for the first time.

Whether the output destination is selected by the user for the first time is determined by referring to a history table as illustrated in FIG. 10, for example. FIG. 10 is a view illustrating an example of a structure of the history table. The history table may be stored in the storing unit 27 or may be stored by the output destination distribution plug-in 61.

The history table of FIG. 10 stores the user name and the output destination in correspondence with each other after determining the output destination of the print data (after distributing the print data to the output destination). Thus, the confirmation screen display determining unit 82 can determine that the read out output destination is selected by the user for the first time if the read out output destination is not stored in the history table of FIG. 10 in correspondence with the user.

When the read out output destination is not selected by the user for the first time, the output destination distribution control unit 81 proceeds to step S15, and distributes the print data to the read out output destination, and causes the output device 12 of the output destination to print the print data. When the read out output destination is selected by the user for the first time, the confirmation screen display determining unit 82 proceeds to step S12 and causes the display unit 83 to display a confirmation screen 1000 as illustrated in FIG. 11 for having the user to confirm whether the output destination is right.

FIG. 11 is an image view of an example of a confirmation screen. By proceeding to step S13, the display unit 83 displays the confirmation screen 1000 on the display device 502 or the like to cause the user to confirm whether the output destination is right. When the output destination displayed in the confirmation screen 1000 is right, the user presses a "YES" button 1001, while when the output destination is wrong, the user presses a "NO" button 1002.

When the "YES" button 1001 is pressed, the output destination distribution control unit 81 proceeds to step S15, distributes the print data to the read out output destination, and causes the output device 12 of the output destination to print the print data.

Figures 12, 13:
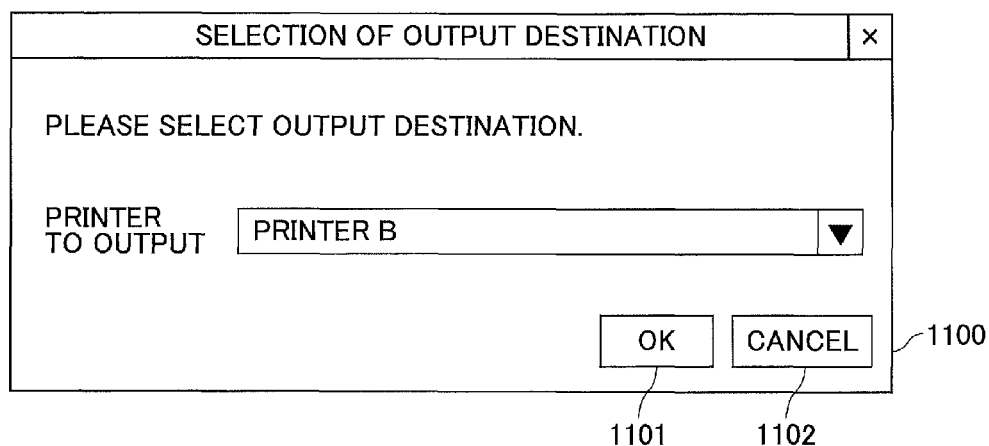
FIG. 12 is an image view illustrating an example of an output destination selection screen.
FIG. 13 is a view illustrating an example of a structure of a double check user table.

When the "NO" button 1002 is pressed, the output destination distribution control unit 81 causes the display unit 83 to display an output destination selection screen 1100 of FIG. 12 for causing the user to reselect an output destination, in step S14.

FIG. 12 is an image view illustrating an example of an output destination selection screen. The display unit 83 displays the output destination selection screen 1100 on the display device 502 or the like, and causes the user to select an output destination. The user selects an output destination from the output destination selection screen 1100 and presses an "OK" button 1101, or presses a "cancel" button 1102.

When the "OK" button 1101 is pressed, the output destination distribution control unit 81 proceeds to step S15, and sends the print data to the output destination that is reselected in the output destination selection screen 1100 to cause the output device 12 of the output destination to print the print data. Further, when the "cancel" button 1102 is pressed, the output destination distribution control unit 81 notifies it to the print flow plug-in 63 to discard the print data.

Here, although an example is described in which the confirmation screen 1000 is displayed on the client terminal 10 of the user who has requested printing in step S12 of FIG. 9, the confirmation screen 1000 may also be displayed on the client terminal 10 of another user for a double check.

When the confirmation screen 1000 is displayed on the client terminal 10 of the other user and performs the double check, as illustrated in FIG. 13 for example, the user and a double check user who performs the double check are stored in correspondence with each other. FIG. 13 is a view illustrating an example of a structure of a double check user table.

The double check user table of FIG. 13 indicates that when a user "User1" selects an output destination for distributing print data for the first time, the confirmation screen 1000 is also displayed on the client terminal 10 of a user "User2".

Further, in the double check user table of FIG. 13, the "double check user" is not set for a user "User3". This means that even when the user "User3" selects an output destination for distributing print data for the first time, a double check is not performed.

Further, in step S15 of FIG. 9, when the output destination distribution control unit 81 distributes print data to the output destination that is reselected in the output destination selection screen 1100, an electronic mail in which the content is described may be sent to a mail address that is previously registered.

In this embodiment, as illustrated in the history table of FIG. 10, an example is described in which a user name and a name of the output device 12 of the output destination are stored in correspondence with each other. However, it is not limited so and it is sufficient to store data capable of uniquely identifying the user and data capable of uniquely identifying the output device 12 in correspondence with each other. The data capable of uniquely identifying the user may be user ID, specific data of an IC card, a device or the like possessed by the user or the like, in addition to the user name. The data capable of uniquely identifying the output device 12 may be output device ID, a MAC address, an IP address, specific data of the output device 12 or the like, in addition to the name of the output device 12 of the output destination.

Further, although it is described that the user name and the output destination are in correspondence with each other in the history table after determining the output destination of the print data (after distributing the print data to the output destination) in this embodiment, the data may be reset at a timing when the rule as defined in FIG. 7 is changed, for example.

Figure 14:
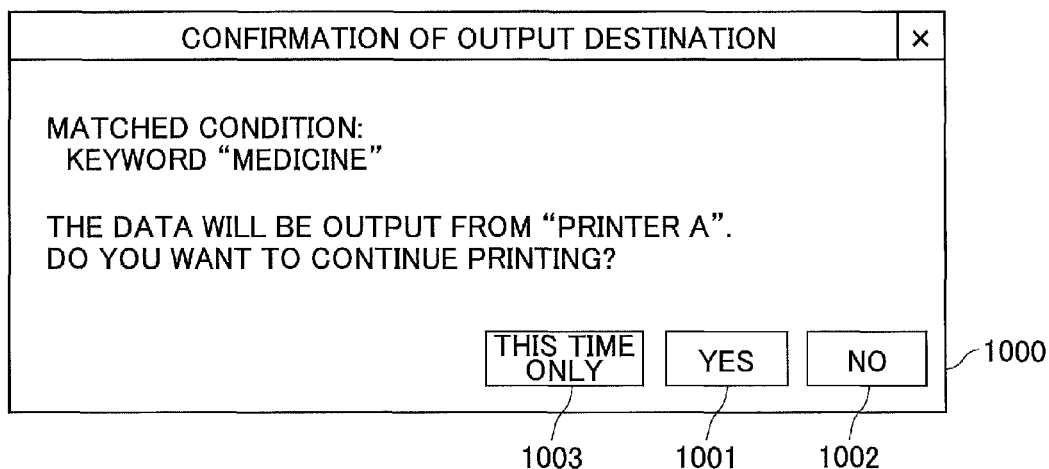
FIG. 14 is an image view illustrating another example of a confirmation screen.

Further, although the confirmation screen 1000 as illustrated in FIG. 11 is displayed by the display unit 83 when the output destination is selected by the user for the first time according to the embodiment, a confirmation screen 1000 as illustrated in FIG. 14 may be displayed, for example. FIG. 14 is an image view illustrating another example of a confirmation screen. The confirmation screen 1000 of FIG. 14 has a structure in which a "this time only" button 1003 is added to the confirmation screen 1000 of FIG. 11.

When the "this time only" button 1003 is pressed, the output destination distribution control unit 81 distributes the print data to the output destination and causes the output device 12 of the output destination to print the print data. However, the output destination distribution control unit 81 does not store it in the history table of FIG. 10. By providing such "this time only" button 1003 in the confirmation screen 1000, the print data can be distributed to the output device 12 without storing the output destination that is exceptionally selected in the history table.

Further, although the user name and the output destination are in correspondence with each other in the history table of FIG. 10, a group such as a section, a company or the like to which the user belongs to and the output destination may be in correspondence with each other, for example. By using such a history table, the client terminal 10 can display the confirmation screen 1000 as illustrated in FIG. 11 on the display unit 83 when distributing the print data to the output destination that is not in correspondence with the group of the user in the history table.

SUMMARY

According to the print system 1 of the embodiment, if the output destination is previously selected by the user to print any print data, as the probability that the output destination is not intended by the user is low, the print data is distributed in accordance with a rule.

On the other hand, according to the print system 1 of the embodiment, when the output destination is not previously selected by the user to print any print data, as the probability that the output destination is not intended by the user is high, a confirmation screen is displayed, and the print data is distributed in accordance with a rule after being confirmed by the user.

As such, according to the print system of the embodiment, as a user can confirm by a confirmation screen when an output destination that is not previously selected by the user to print any print data is selected, a situation in which the print data is distributed to a wrong output destination not intended by the user can be effectively prevented.

According to the embodiment, a situation in which output data is distributed to a wrong output destination can be prevented.

Although a preferred embodiment of the terminal device, the output system and the output method has been specifically illustrated and described, it is to be understood that minor modifications may be made therein without departing from the spirit and scope of the invention as defined by the claims.

The present invention is not limited to the specifically disclosed embodiments, and numerous variations and modifications may be made without departing from the spirit and scope of the present invention.

For example, the print system 1 may include another apparatus such as an authentication server apparatus, a print server apparatus or the like.

The print system 1 to which the client terminal 10 and the output devices 12 are connected via the network N1 is an example of an output system that prints, displays, transfers or the like output data such as print data, image data, display data, application data or other electronic data.

The client terminal 10 is an example of a terminal device. The rule illustrated in FIG. 7 is an example of first information. The history table illustrated in FIG. 10 is an example of second information. The double check user table illustrated in FIG. 13 is an example of third information.

The present invention can be implemented in any convenient form, for example using dedicated hardware, or a mixture of dedicated hardware and software. The present invention may be implemented as computer software implemented by one or more networked processing apparatuses. The network can comprise any conventional terrestrial or wireless communications network, such as the Internet. The processing apparatuses can compromise any suitably programmed apparatuses such as a general purpose computer, personal digital assistant, mobile telephone (such as a WAP or 3G-compliant phone) and so on. Since the present invention can be implemented as software, each and every aspect of the present invention thus encompasses computer software implementable on a programmable device. The computer software can be provided to the programmable device using any storage medium for storing processor readable code such as a floppy disk, hard disk, CD ROM, magnetic tape device or solid state memory device.

The present application is based on and claims the benefit of priority of Japanese Priority Application No. 2015-051675 filed on Mar. 16, 2015, the entire contents of which are hereby incorporated by reference.

What is claimed is:

1. A terminal device connected to one or more output devices via a network, the terminal device comprising:
   a processor; and
   a memory storing instructions that, when executed, cause the processor to perform steps of
      upon receiving a request from a user for outputting output data,
         referring to first information in which a plurality of conditions for output data and a plurality of output destinations are in correspondence with each other, respectively, and
         selecting and reading out the output destination of the output data from the first information that is in correspondence with the condition for output data that is satisfied by the output data, the conditions being different from data that uniquely identifies the user,
      referring to second information in which the data that uniquely identifies the user and an output destination that is previously selected by the user to distribute output data are in correspondence with each other,
      distributing, when the output destination read out from the first information is in correspondence with the user in the second information, the output data to the output destination to be output by the output device of the output destination,
      determining that the output destination read out from the first information is selected for the user for the first time when the output destination read out from the first information is not in correspondence with the user in the second information,
      causing, when the output destination read out from the first information is selected for the user for the first time, to display a confirmation screen of the output destination selected and read out from the first information to confirm whether the output destination is right, and distributing, after the confirmation screen of the output destination is confirmed by the user, the output data to the output destination to be output by the output device of the output destination.

2. The terminal device according to claim 1, wherein the instructions stored in the memory, when executed, further cause the processor to perform steps of
causing, when the confirmation screen of the output destination is not confirmed by the user, to display an output destination selection screen for selecting an output destination of the output data for the user, and accepting change of an output destination of the output data from the user.

3. The terminal device according to claim 1, wherein the instructions stored in the memory, when executed, further cause the processor to perform a step of referring to third information in which the user and another user are in correspondence with each other, and
wherein in the causing to display the confirmation screen, the confirmation screen is displayed on a terminal device of the other user who is in correspondence with the user.

4. The terminal device according to claim 1, wherein the selecting and reading out the output destination includes
referring to the first information in which a keyword is in correspondence with the output destination as the condition,
selecting the output destination that is in correspondence with a keyword included in the output data, and
reading out the selected output destination.

5. The terminal device according to claim 1, wherein the first information is stored in the memory.

6. An output system to which a terminal device and an output device are connected via a network, the output system comprising:
a processor; and
a memory storing instructions that, when executed, cause the processor to perform steps of
upon receiving a request from a user for outputting output data,
referring to first information in which a plurality of conditions for output data and a plurality of output destinations are in correspondence with each other, respectively, and
selecting and reading out the output destination of the output data from the first information that is in correspondence with the condition for output data that is satisfied by the output data, the conditions being different from user ID that uniquely identifies the user,
referring to second information in which data that uniquely identifies the user and an output destination that is previously selected by the user to distribute output data are in correspondence with each other,
distributing, when the output destination read out from the first information is in correspondence with the user in the second information the output data to the output destination to be output by the output device of the output destination,
determining that the output destination read out from the first information is selected for the user for the first time when the output destination read out from the first information is not in correspondence with the user in the second information,
causing the terminal, when the output destination read out from the first information is selected for the user for the first time, to display a confirmation screen of the output destination selected and read out from the first information to confirm whether the output destination is right, and
distributing, after the confirmation screen of the output destination is confirmed by the user, the output data to the output destination to be output by the output device of the output destination.

7. The output system according to claim 6, wherein the instructions stored in the memory, when executed, further cause the processor to perform steps of
causing, when the confirmation screen of the output destination is not confirmed by the user, to display an output destination selection screen for selecting an output destination of the output data for the user, and accepting change of an output destination of the output data from the user.

8. The output system according to claim 6, wherein the instructions stored in the memory, when executed, further cause the processor to perform a step of referring to third information in which the user and another user are in correspondence with each other, and
wherein in the causing to display the confirmation screen, the confirmation screen is displayed on a terminal device of the other user who is in correspondence with the user.

9. The output system according to claim 6, wherein the selecting and reading out the output destination includes
referring to the first information in which a keyword is in correspondence with the output destination as the condition,
selecting the output destination that is in correspondence with a keyword included in the output data, and
reading out the selected output destination.

10. The output system according to claim 6, wherein the first information is stored in the memory.

11. An output method performed in an output system to which a terminal device and an output device are connected via a network, the output method comprising:
upon receiving a request from a user for outputting output data,
referring to first information in which a plurality of conditions for output data and a plurality of output destinations are in correspondence with each other, respectively, and
selecting and reading out the output destination of the output data from the first information that is in correspondence with the condition for output data that is satisfied by the output data, the conditions being different from user ID that uniquely identifies the user;
referring to second information in which data that uniquely identifies the user and an output destination that is previously selected by the user to distribute output data are in correspondence with each other;
distributing, when the output destination read out from the first information is in correspondence with the user in the second information, the output data to the output destination to be output by the output device of the output destination;
determining that the output destination read out from the first information is selected for the user for the first time when the output destination read out from the first information is not in correspondence with the user in the second information;

causing the terminal device, when the output destination read out from the first information is selected for the user for the first time, to display a confirmation screen of the output destination selected and read out from the first information to confirm whether the output destination is right; and distributing, after the confirmation screen of the output destination is confirmed by the user, the output data to the output destination to be output by the output device of the output destination.

12. The output method according to claim 11, further comprising:

causing, when the confirmation screen of the output destination is not confirmed by the user, to display an output destination selection screen for selecting an output destination of the output data for the user; and accepting change of an output destination of the output data from the user.

13. The output method according to claim 11, further comprising:

referring to third information in which the user and another user are in correspondence with each other, and wherein in the causing to display the confirmation screen, the confirmation screen is displayed on the terminal device of the other user who is in correspondence with the user.

14. The output method according to claim 11, wherein in the selecting and reading out, referring to the first information in which a keyword is in correspondence with the output destination as the condition, selecting the output destination that is in correspondence with a keyword included in the output data, and reading out the selected output destination.

* * * * *